(12) United States Patent
Chartrand et al.

(10) Patent No.: US 7,124,208 B2
(45) Date of Patent: Oct. 17, 2006

(54) METHOD AND APPARATUS FOR ENUMERATING DEVICES ON A LINK

(75) Inventors: Brent D. Chartrand, Cameron Park, CA (US); Philip R. Lehwalder, Hillsboro, OR (US); Alberto J. Martinez, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 10/417,856

(22) Filed: Apr. 17, 2003

(65) Prior Publication Data

US 2004/0210682 A1 Oct. 21, 2004

(51) Int. Cl.
*G06F 3/00* (2006.01)
(52) U.S. Cl. .............................. 710/9; 710/10; 710/110
(58) Field of Classification Search .................... 710/9, 710/10, 17, 19, 104, 109, 110, 301, 302; 381/77; 370/449–451, 457
See application file for complete search history.

(56) References Cited

U.S. PATENT DOCUMENTS

| | | | |
|---|---|---|---|
| 5,815,583 A * | 9/1998 | Solomon et al. ............... 381/77 |
| 6,259,957 B1 * | 7/2001 | Alexander et al. ............. 700/94 |
| 6,401,152 B1 * | 6/2002 | Solomon et al. ............. 710/104 |
| 6,609,170 B1 * | 8/2003 | Lehwalder et al. ......... 710/301 |
| 6,820,141 B1 * | 11/2004 | Bennett ....................... 710/15 |
| 2001/0022787 A1 * | 9/2001 | Mchale ....................... 370/442 |

OTHER PUBLICATIONS

Audio Codec Componebt Specification, Rev. 2.2, Intel, Sep. 2000.*
Audio Codec 97, Technical FAQ Sheet, Rev. 1.0, Intel, 1996.*
AC97 Rev. 2.1 Codec with Sample Rtae Conversion and National 3D Sound, National Semiconductor, Sep. 2000.*

* cited by examiner

*Primary Examiner*—Khanh Dang
(74) *Attorney, Agent, or Firm*—Sharon Wong

(57) ABSTRACT

Embodiments of the present invention provide for enumerating codecs on a link. A controller asserts a synchronization signal, and drives one or more control lines associated with selected codecs to a first state. The enumeration period is defined by a predefined number of clock periods after de-assertion of the synchronization signal. During the enumeration period, the controller drives the control lines of codecs that are supported to a second state. If the control line for a codec is not pulled to the second state during the enumeration period, that codec will act disabled, ignoring all inputs, and will not participate in any link activity, until the next reset, where it will again look for an assertion of its control line.

15 Claims, 8 Drawing Sheets

METHOD AND APPARATUS FOR ENUMERATING DEVICES ON A LINK

BACKGROUND

A codec (coder/decoder) is an integrated circuit or other electronic circuitry combining the circuits needed to convert digital signals into analog signals and to convert analog signals into digital signals. Audio codecs are used in computers, for example, on modem (modulator/demodulator) and sound cards to convert digital signals that can be read and stored by the computer into analog signals that can be transmitted over telephone wires or output to speakers for sound. Codecs on these devices also convert incoming signals from telephone wires or input sound signals, into a digital format that can be read, understood, and stored by the computer.

Enumeration of codecs is described by the Audio Codec '97 Specification, version 2.3 ("AC '97 Specification"), published by Intel Corporation, Santa Clara, Calif. The AC '97 Specification defines a high-quality audio architecture and advanced the migration toward a completely digital audio system, while maintaining support for analog audio sources and analog interconnect for backwards compatibility. A controller and one or more codecs, connected by a digital serial link, processes audio and modem signals (e.g., perform digital/analog conversions (DAC) and analog/digital conversions (ADC)).

As defined by the AC'97 Link specification, a codec attached to a link must be assigned an address using pins on the codec. This "hard" or "hard-wired" enumeration leads to many ease of use and configuration issues, as the methods for making sure that all codecs on the link are unique require platform design predetermination.

DETAILED DESCRIPTION

Figure 1:
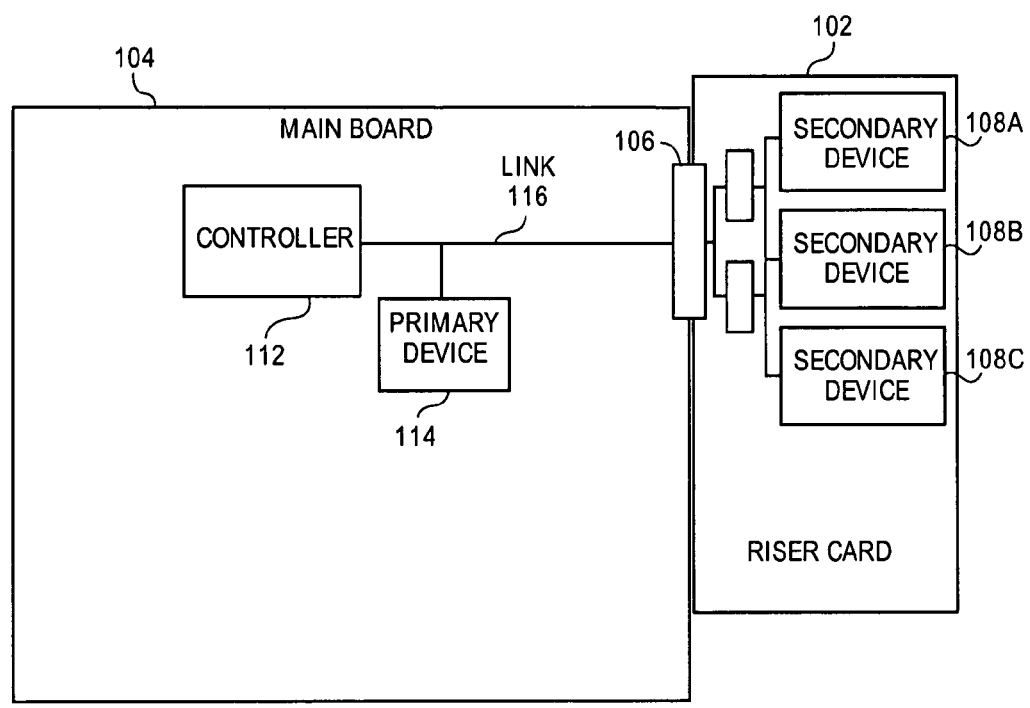
FIG. 1 shows a block diagram of an embodiment of a computer system with multiple electrical devices.

Embodiments of the present invention provide for enumerating codecs on a link, such as AC'97. A controller asserts a synchronization signal, and drives one or more control lines associated with selected codecs to a first state (for example, high state). The enumeration period is defined by a predefined number of clock periods after de-assertion of the synchronization signal. During the enumeration period, the controller drives the control lines of codecs that are supported to a second state (for example, low state). In particular, each codec determines the number of clock periods that expired before its control line was pulled to the second state (i.e. low state). The codec's address may be generated based upon the number of clock periods determined. If the control line for a codec is not pulled to the second state during the enumeration period, that codec will act disabled, ignoring all inputs, and will not participate in any link activity, until the next reset, where it will again look for an assertion of its control line.

Although a specific embodiment is described for such a system, it is to be understood that the concepts described herein may be equally applied to any system of electrical devices requiring enumeration. For example, embodiments of the invention can also be used in new links and busses with similar signal configurations.

In the detailed description, numerous specific details are set forth in order to provide a thorough understanding of the present invention. One skilled in the relevant art will recognize, however, that the invention can be practiced without one or more of the specific details, or with other methods, components, etc. In other instances, well-known structures or requests are not shown or described in detail to avoid obscuring aspects of various embodiments of the invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

In a typical implementation, separate codecs may be provided for independent audio and modem analog front end ("AFE") functionality. In addition, computer systems including a laptop computer with a desktop docking station may include a codec in the laptop and another in the docking station. Computer systems and other devices with high-end audio capability (e.g., a multi-channel digital audio system) may use multiple codecs (e.g., three standard, two-channel codecs on a riser card) to implement the audio system. The provision of multiple codecs, however, requires a method of enumerating codecs on AC'97 and similar links.

FIG. 1 shows a block diagram of one embodiment 100 of a computer system with multiple electrical devices. The embodiment shown in FIG. 1 includes a riser card 102 that is electrically attached to a main board 104 via a riser connector 106. The riser card 102 is comprised of one or more devices (108a, 108b, and 108c) that connect to a link 110. Components of this system are installed on the mainboard 104, including a controller 112 and a primary device 114. The controller 112 and the primary device 114 are linked to the riser card 102 via an electrical connection that, for purposes of illustration, is called a link 116. The link 116 may be comprised of, but is not limited to, a serial digital interconnect. This link 116 connects the controller 112 and primary device 114 on the main board 104 with the devices 108a–c on the riser card 102. When multiple devices 114, 108a–c are present in a system, there includes a mechanism to enumerate the devices on the link 116.

Figure 2:
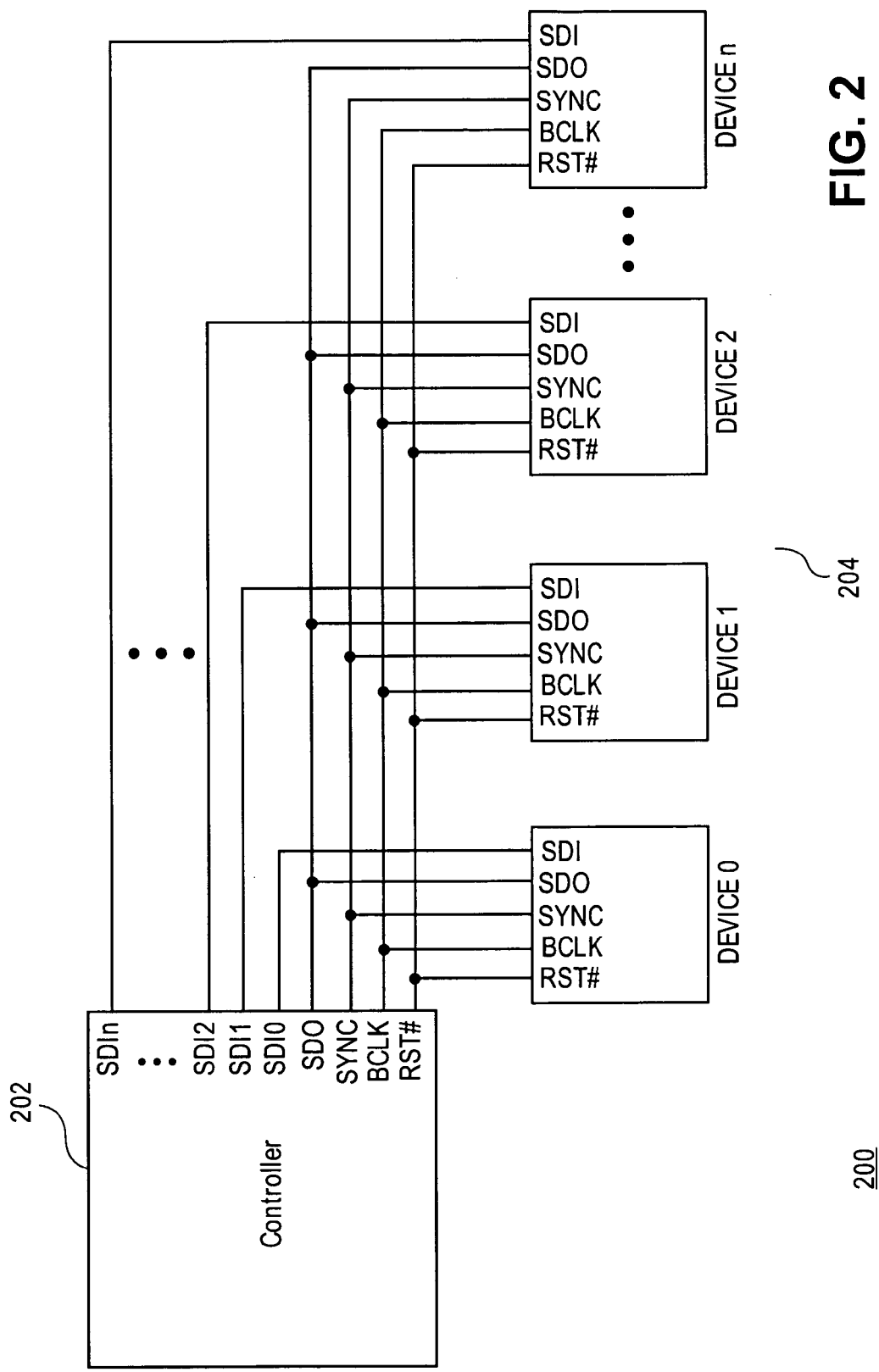
FIG. 2 is a schematic diagram showing the signal and pin configurations employed in an embodiment of the present invention.

FIG. 2 is a schematic diagram showing the signal and pin configurations employed in an embodiment 200 of the present invention. Connection lines between controller 202 and devices 204 in a multi-device environment are shown. The connections between several of the pins of a device 204 and controller 202 are shown, labeled with their associated signals.

The synchronizationSYNC (synchronization) pin on controller 202 is connected to a synchronization pin on each of the codecs 204. The synchronization signal may be used to synchronize the operation of the multiple devices 204 and controller 202. Controller 202 drives the synchronization signal. The synchronization signal marks input and output frame boundaries (such as a frame synchronization), as well as identifying outbound data streams.

The bit clock pin of controller 202 is connected to the bit clock pins of devices 204 providing the link bit transfer clock. The bit clock signal may be, for example, a 24 MHz clock. One implementation may transition data on the link 22 on every rising edge of bit clock, and subsequently sampled on the receiving side of the link on each immediately following falling edge of bit clock. Another implementation might transition and sample data on every edge of bit clock.

The reset pin (RST#) of controller 202 is connected to the reset pins of the devices 204 on the link reset is an asynchronous input signal. A hard reset is achieved by asserting reset for a minimum specified time. By driving reset to a first state such as low, and then de-asserting it (driving it high again), the bit clock, and SDO (serial data out) signals will be activated, or re-activated as the case may be, and all device control registers will be initialized to their default, power on, reset values.

The signals shown in the embodiment of FIG. 2 are named with respect to the controller 202. The control line in signals designated as SDI (serial data in) include signals that are input into the controller 202, and therefore are the output signals of the codecs 204. The control line out signals designated as SDO (serial data out) include signals that are output from the controller 202, and carries the inputs to the devices 204 on the link. For purposes of illustration, the control line signals will be referred to as SDI and the control line out signals will be referred to as SDO.

The SDI point to point signal acts as a digital data and control pipe between controller 202 and each device 204 on the link. For each device 204 on the link, the SDI signal may be a serial, time division multiplexed, output stream that carries the digital output of the device 204 to controller 202.

Embodiments of the present invention provide each device 204 on the link with a unique address and no external circuitry, eliminating the difficulty, cost, and potential implementation error. The initialization sequence provides each device 204 with a unique identification by which it can thereafter be addressed with commands on the SDO (broadcast) signal. During this sequence the controller provides each requesting device 204 with a unique identification using its attached SDI signal(s). In order to minimize different start-up sequences, this initialization sequence will also be used when a device 204 signals its intent to go from a low power to normal state in the presence of an otherwise running system.

Request for Initialization

Figure 3:
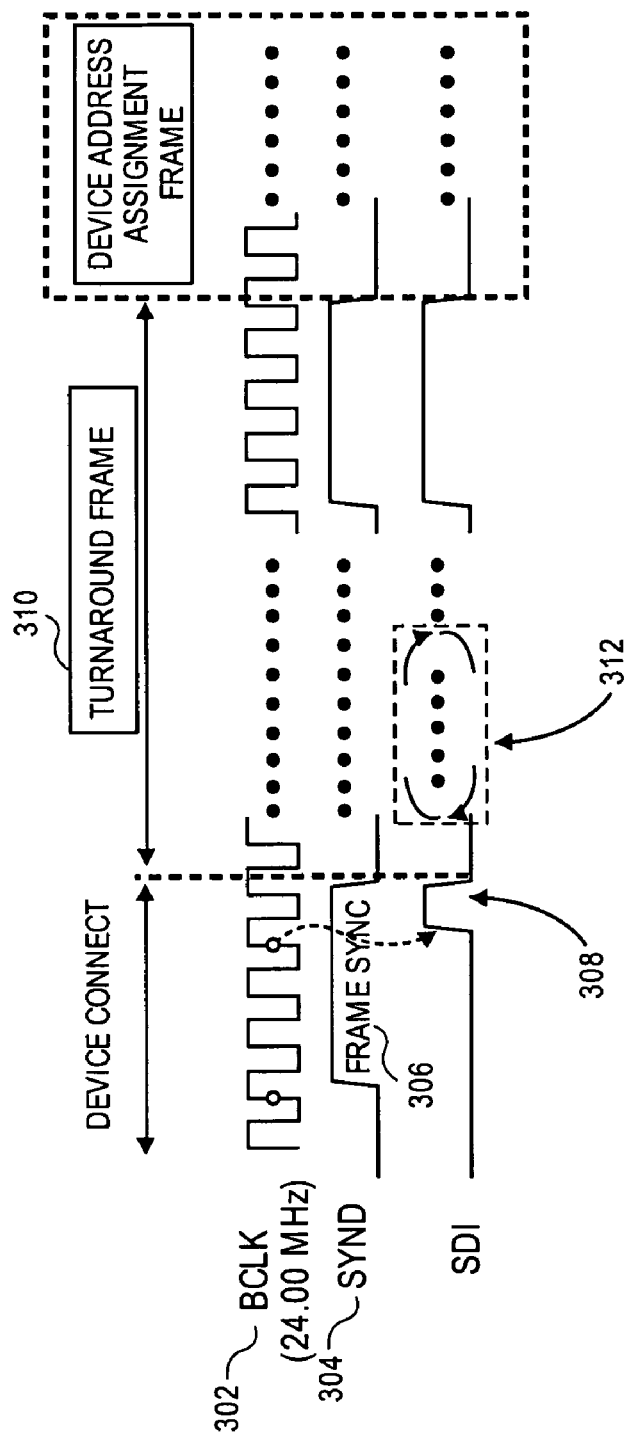
FIG. 3 is a diagram of an embodiment of a codec request sequence for initialization.

FIG. 3 is a diagram of an embodiment 300 of a device request sequence for initialization. Device enumeration can occur anytime the link is a normal operational state. For example, if a link is in a normal operational state and a new device is connected, the device will detect a frame synchronization, drive SDI high, before the last bit clock cycle of the frame synchronization and request initialization. The sequence does not require the link to be in reset. In particular, a hard reset is not required on the link. Enumeration may be followed by normal link operation.

Figure 4:
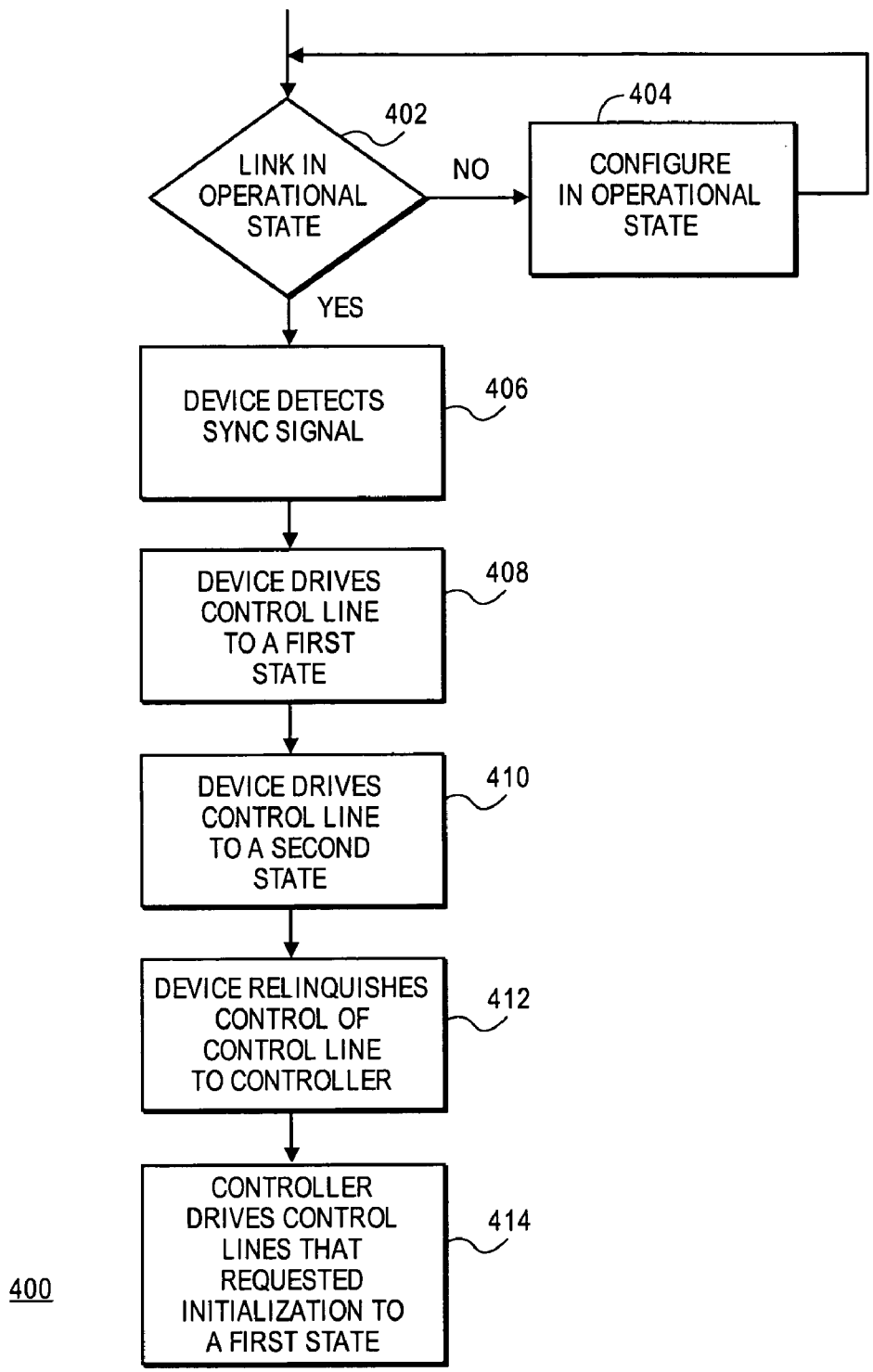
FIG. 4 is a flow chart of an embodiment of the codec request sequence for initialization shown in FIG. 3.

The enumeration sequence occurs independent of other devices. For example, a new device can be enumerated and placed in a normal operating state without interrupting operation of devices on the link FIG. 4 is a flow chart of an embodiment 300 of the device request sequence for initialization shown in FIG. 3.

In step 402, it is determined whether the link is in an operational state. If the link is in an operation state, the sequence proceeds to step 404. As noted above, if a link is in a normal operational state, the sequence does not require the link to be in reset. In particular, a hard reset is not required on the link. Enumeration may be followed by normal link operation.

In step 402, if the link is not in an operational state, it may be configured in an operation state (step 404). If a device is requesting a power state change when the link is in a low power state (bit clock and synchronization not operating), it drives SDI to a first state, such as high, continuously until it detects the first frame synchronization. It then synchronously drives SDI to a second state, such as low, on the same rising edge of the bit clock as the de-assertion of the frame synchronization.

In another embodiment, to achieve an operational state, the controller provides a properly running bit clock 302 (FIG. 3) for a predefined period before the de-assertion of the reset link signal. This allows time for codec phase locked loops to lock. The reset link signal is then de-asserted.

In step 406, a synchronization signal is detected. Referring to FIG. 3, in a typical implementation, the synchronization signal 304 commences signaling valid frames on the link, with the first frame synchronization 306 occurring a predefined number of bit clock cycles (for example, minimum of four bit clock cycles) after the de-assertion of the reset link signal. In a typical implementation, devices on the link may distinguish a frame synchronization marker from an outbound stream tag on synchronization by detecting synchronization driven to a first state, for example high, for a predefined (for example, four) consecutive SDO bit times (2 bit clock cycles).

In step 408, in response to a synchronization signal being detected, the device drives a control line associated with the device to a first state. Referring to FIG. 3, in a typical implementation, coincident with the first frame synchronization 306, a devices signals request for initialization via SDI 308. In particular, the device signals its request for a power state change and/or initialization on SDI 308. Once frame synchronization 306 has been detected, devices signal a state change or initialization request by synchronously driving SDI 308 to a first state, for example high, during last bit clock cycle of frame synchronization 306. SDI is asserted for the entire bit clock cycle and synchronously de-asserted on the same rising edge of bit clock as the de-assertion of the frame synchronization 306.

In step 410, the device drives the control line to a second state when a connection to the controller is established. In a typical implementation, the device drives SDI low for one full bit clock cycle following the request for initialization and then releases SDI (turnaround) to be driven by the controller in the subsequent address frame. In step 412, in response to connection to the controller, the device relinquishes control of the control line to the controller. Referring to FIG. 3, in a typical implementation, in the turnaround frame 310, devices and controllers turn SDI around (reverse driving direction) upon the completion of the connect frame. In particular, the device actively drives SDI low for one bit clock cycle immediately following de-assertion of the frame synchronization 306 signal at the end of the connect frame. The device then tri-states its SDI drivers on the second bit clock of the turnaround frame.

On a predefined bit clock, such as the 497$^{th}$ bit clock, as the synchronization signal is driven high for frame synchronization 306, the controller also drives SDI signals 308 high that have signaled state change or initialization request. These SDI signals 308 remain driven high through the end of the turnaround frame in preparation for the subsequent address frame.

Initialization

Figure 5:
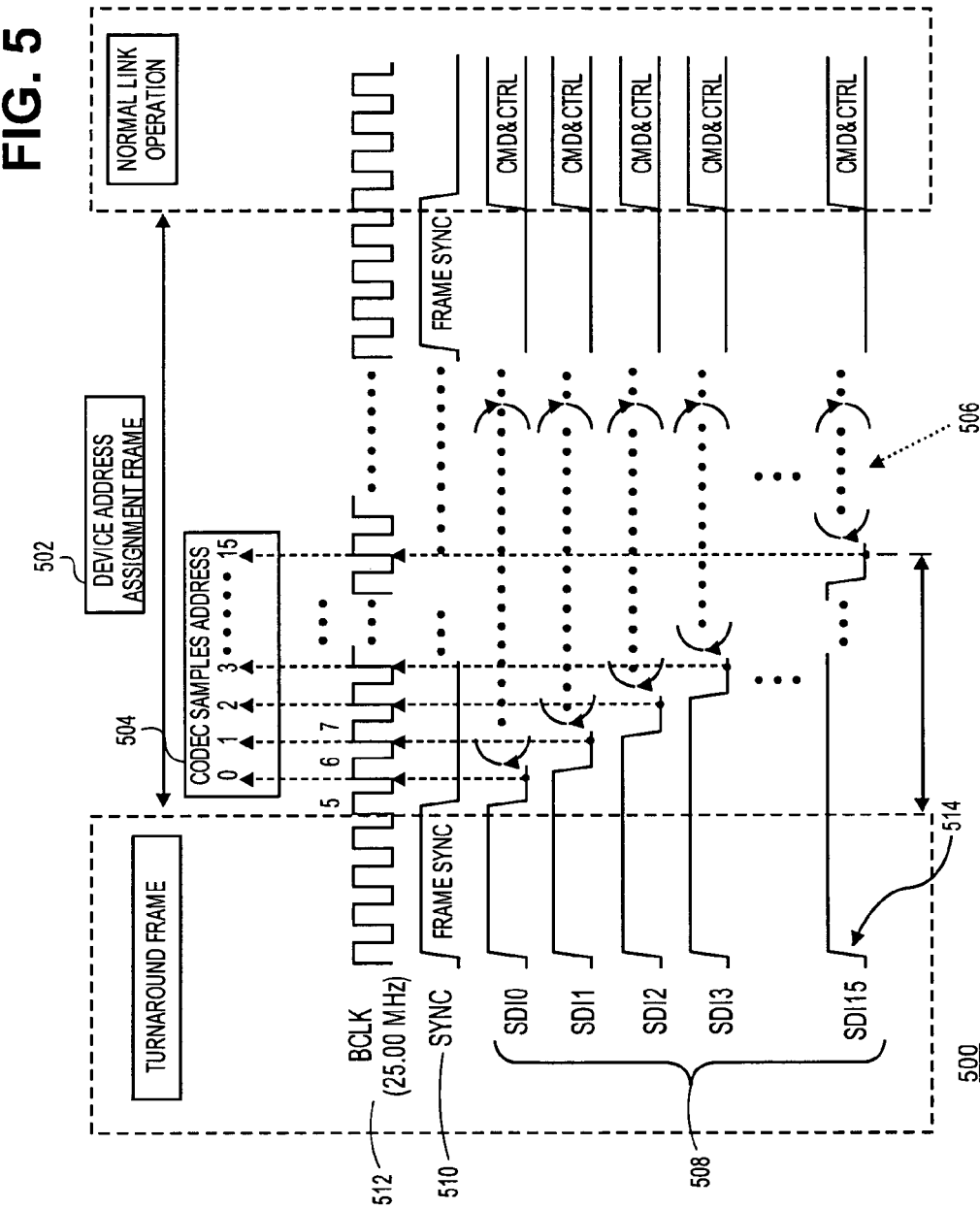
FIG. 5 is a diagram of an embodiment of a codec initialization sequence.

FIG. 5 is a diagram of an embodiment 500 of a device initialization sequence. In particular, the device address frame 502 includes an address assignment 504 followed by a final SDI turnaround 506 in preparation for normal operation.

Figure 6:
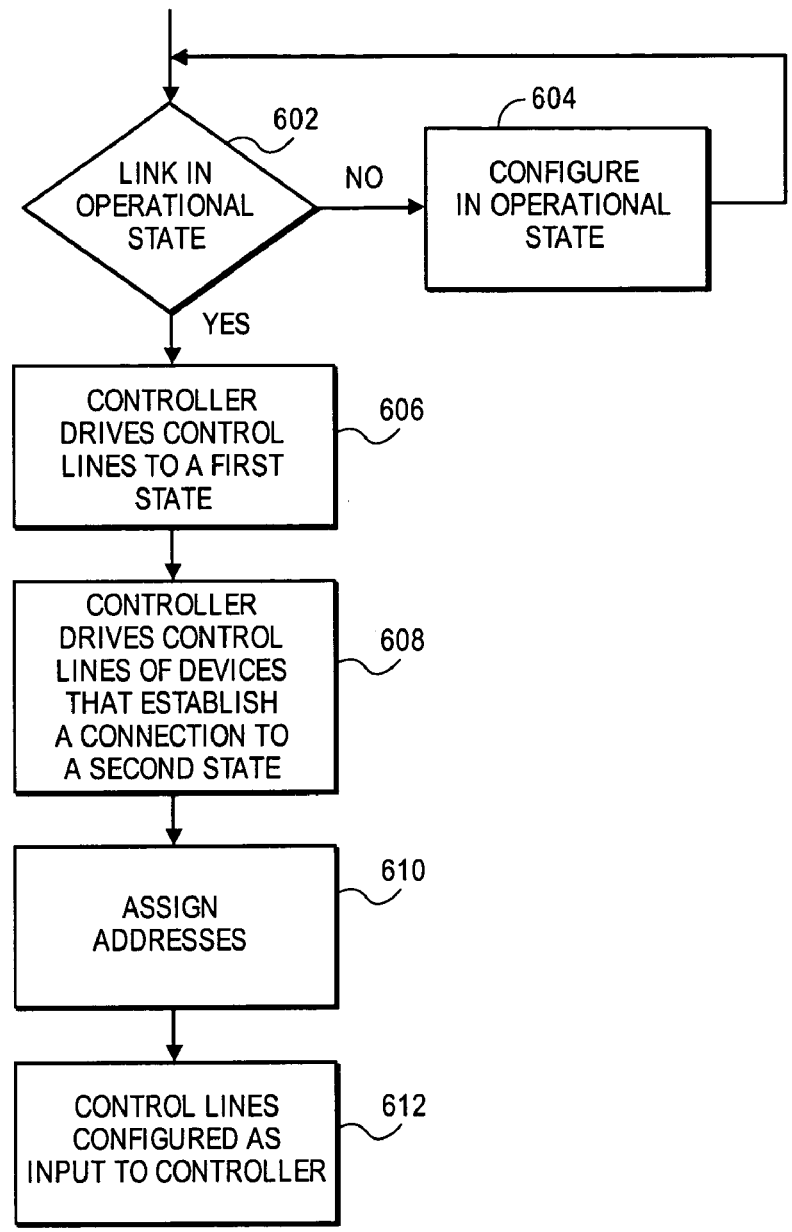
FIG. 6 is a flow chart of an embodiment of the codec initialization sequence shown in FIG. 5.

FIG. 6 is a flow chart of an embodiment 600 of the device initialization sequence shown in FIG. 5 for one SDI signal. The following sequence applies to all SDI signals, but may occur on any SDI independent of any other SDIs state of operation, excluding a hard reset. This allows for independent enumeration of devices, facilitating a "hot plug" environment where device may be connected to the link, enumerated, and become functional while the link is in a running state, without interruption of normal link operation.

In step 602, it is determined whether the link is in an operational state. If the link is in an operational state, the sequence proceeds to step 604. As noted above, if a link is in a normal operational state, the sequence does not require the link to be in reset.

In step 602, if the link is not in an operational state, it may be configured in an operation state (step 604).

In step 606, the controller drives control lines associated with each devices requesting initialization to a first state. In a typical implementation, the controller drives SDI 514 to signal address to the device connection to the controller. During the address frame, SDI 508 is a device input, and is driven by the controller, beginning in the last 4 bit clock periods 512 (frame synchronization 510) of the turnaround frame.

In step 608, the controller drives control lines of devices that establish a connection with the controller within a predefined period to a second state. Referring to FIG. 5, the falling edge of frame synchronization 510 marks the start of device address assignment 504.

In step 610, addresses are assigned assigned. In a typical embodiment, the controller drives the SDI lines in sequential order to assign addresses. For example, referring to FIG. 5, in a sixteen codec configuration, this results in the codec attached to SDI0 being assigned address "0" through codec attached to SDI15 being assigned "15".

In another implementation, address assignment is indicated by the controller holding each SDI 508 high for the number of bit clock cycles 512 equal to the numeric identification of that particular SDI; i.e., SDI $_0$ is held high for zero bit clock cycles 512 after the beginning of the frame, and SDI$_n$ is held high for n bit clock cycles. Thus the unique identification of the device becomes the same as its attached SDI 508. In this embodiment, devices count from zero to fifteen starting on the rising edge of bit clock 512 following the de-assertion of frame synchronization, and latch the value of the count as their address on the first rising edge of bit clock 512 where synchronization 510 and SDI 508 are both sampled low.

Devices whose control lines are supported are de-asserted within the predefined period. In a typical implementation, the controller supports devices whose control lines are de-asserted within the predefined period. The controller drives each SDI 508 low for at least one clock cycle. The controller tri-states its SDI driver bit clock.

In step 612, the SDI 508 then becomes an input to the controller. Sometime during, but before the end of the frame sync at the end of the address frame, the device starts driving the SDI 508 low, in preparation for normal operation. Normal link operation starts on the frame following the completion of the address frame. Devices are required to actively drive a correct response field, and to be ready to accept commands, in this and subsequent frames.

Devices participate in normal link operation if their SDIs have been assigned an address. Devices that do not receive an address for their SDI ignore SDO data, and drive their SDI lines low during normal link operation. Devices that have not been completely initialized receive a link level reset and are initialized, with SDI lines receiving an address, before they are active participants on the link.

Devices that use multiple SDI lines follow the same initialization sequence as specified above for each connected SDI line. A multi-SDI device receives and stores an address assignment for each of its SDI lines. When the device is enumerated, software will determine which is the primary identification, if appropriate to that device, and which identification(s) should be used for addressing verbs to this device. During this device enumeration, software also discovers and configures all other device capabilities.

Figure 7:
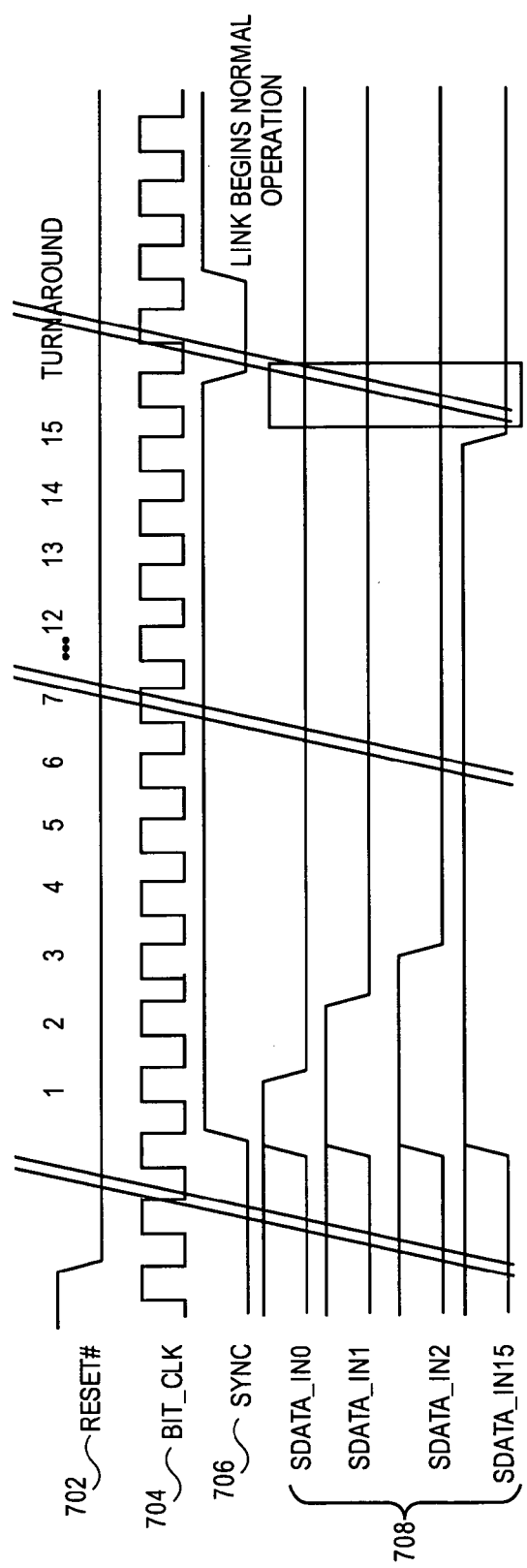
FIG. 7 is a diagram of another embodiment of a codec initialization sequence.
Figure 8:
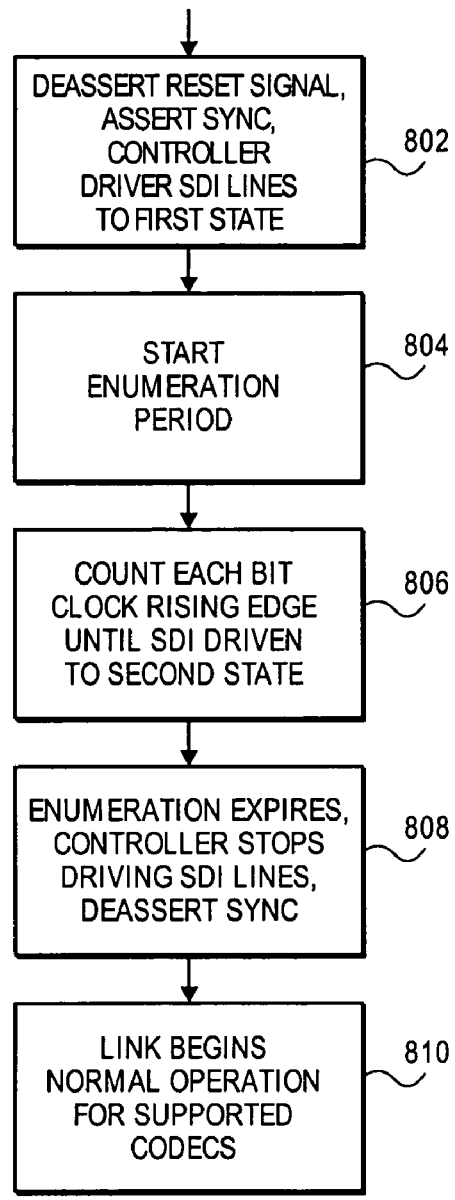
FIG. 8 is a flow chart of another embodiment of the codec initialization sequence shown in FIG. 7.

FIG. 7 is a diagram of another embodiment 700 of a device initialization sequence. FIG. 8 is a flow chart of another embodiment 800 of the device initialization sequence shown in FIG. 7. Referring to FIGS. 7 and 8, in step 802, the controller de-asserts the reset signal 702 and asserts the synchronization signal 706 to begin the enumeration phase, and drives one or more SDI lines 708 associated with selected devices to a first state (for example, high state). For example, after the reset signal 702 has been de-asserted, assertion of the synchronization signal 706 begins the enumeration phase. This may happen immediately after the reset signal 702 is de-asserted, or may occur some amount of time after the reset signal 702 is de-asserted to allow phase locked looks (PLLs) and codecs to initialize. When the controller asserts the synchronization signal 706, it drives the SDI lines 708 to a first state (for example, high state).

Before the synchronization period, the state of the SDI lines 708 is undefined; neither the controller nor the device is expected to drive them. They may be pulled to some known state by resistors to prevent the lines from floating.

In step 804, an enumeration period is started. The enumeration period is defined by a predefined number of clock periods after assertion of the synchronization signal 706. In a typical embodiment, the first 16 bit clocks 704 after the first assertion of the synchronization signal 706 are defined as the enumeration period. During the enumeration period, the controller drives the SDI lines 708 of devices that are supported to a second state (for example, low state).

In step 806, when the synchronization signal 706 is asserted, a counter in each device starts counting each bit clock rising edge, and is stopped when the SDI line for that device is driven to a second state (for example, low state) by the controller. The device's address is based upon the number of rising edges of bit clock 704 counted before the SDI line 708 was driven to the second state.

In one embodiment, the controller drives the SDI line 708 of each device line it supports to the second state (for example, low state) in sequential order. In a typical embodiment with sixteen codecs, this will result in the device attached to SDI0 being assigned address '0', through the device attached to SDI15 which is assigned address '15'.

In another embodiment, the controller drives the SDI line 708 of each device line it supports to the second state (for example, low state) in a non-sequential order to assign specific addresses to device.

In step 808, after the enumeration period expires, the controller stops driving the SDI lines associated with selected devices to the second state (for example, low state) and the device(s) supported begin driving their respective lines in the second state. The synchronization signal will be de-asserted by the controller after the enumeration period expires. In a typical embodiment, the $16^{th}$ bit clock 704 period after the synchronization signal 706 is asserted is the turnaround for the SDI lines 708. The controller will stop driving the SDI lines low, and the device(s) will begin driving their respective lines low. The controller also asserts the synchronization signal 706 after the enumeration period expires.

In step 810, after the enumeration period expires, the link begins normal operation for the supported device. In a typical embodiment, starting at the $17^{th}$ bit clock 704, the link begins normal operation. The synchronization signal 706 will be asserted at some point in the future to mark the beginning of a normal link frame.

In a typical implementation, if a device does not see its SDI line 708 asserted at some point during the enumeration period (for example, the first 15 bit clock rising edges), it will act as disabled and ignore all inputs, and will not participate in any link activity, until the next reset, where it will again look for an assertion of its SDI line 708.

From the controller's point of view, when the software command to de-assert reset is received, it will de-assert reset, and then wait some amount of time to allow device and link initialization. The synchronization signal 706 will then be asserted, and the SDI lines driven high for selected codecs. Each SDI line that it supports will then be driven low in order. On the 16th bit clock 704, the controller stops driving the SDI lines 708 and configures the SDI lines 708 as inputs. On the 17th bit clock 704, the synchronization signal 706 is de-asserted, and the link begins normal operation with the supported devices.

Although an embodiment of the invention has been described in terms of addressing and routing signals of device, it is to be understood that the scope of the invention, as defined in the claims, is broader than this exemplary application. The present invention, as defined in the claims, may be applied to any group of integrated circuits, or other electrical devices where it must be indicated whether an implementation of a device is found in a certain location, and the address identifications and routing of signals from other devices must be adjusted accordingly. Furthermore, it is to be understood that certain components of the invention described above as being implemented in hardware (e.g., a routing module, an address identification module) may also be implemented using software or a combination of hardware and software, with in the scope of the invention.

What is claimed is:

1. A method for identifying devices in communication with a controller via a link, comprising:

configuring the link in an operational state;

receiving a controller request to assert each control line associated with each device;

receiving a controller request to de-assert each control line of each device that establishes a connection with the controller within a predefined period;

supporting devices whose control lines were de-asserted within the predefined period; and in response to each control line of each device that establishes a connection with the controller, assigning addresses to each device and receiving a controller request to drive each control line associated with each device to a first state for the number of bit clock cycles equal to the numeric identification of the particular control line.

2. The method claimed in claim 1, wherein receiving a controller request to assert each control line associated with each device further comprises:

receiving a controller request to drive each control line associated with each device to a first state.

3. The method claimed in claim 1 wherein receiving a controller request to de-assert the control line of each device that establishes a connection with the controller within a predefined period further comprises:

receiving a controller request to drive each control line of each device that establishes a connection with the controller to a second state within a predefined period.

4. The method claimed in claim 3, wherein receiving a controller request to drive each control line of each device that establishes a connection with the controller to a second state within a predefined period further comprises:

receiving a controller request to drive each control line of each device in sequential order.

5. The method claimed in claim 1, wherein assigning addresses to each device in response to each control line of each device that establishes a connection with the controller further comprising: de-asserting the frame synchronization signal; and initiating addressing in response to de-assertion of the frame synchronization signal.

6. The method claimed in claim 5, wherein initiating addressing in response to de-assertion of the frame synchronization signal further comprises:

initiating addressing in response to the falling edge of the frame synchronization signal upon de-assertion.

7. The method claimed in claim 1 further comprising:

in response to connection to the controller, receiving a device request to relinquish control of the control line to the device.

8. An apparatus, comprising:

a controller;

a link configured in an operational state; and at least one device, wherein in response to the link being configured in an operational state, the controller asserts each control line associated with each device requesting initialization, de-asserts each control line of each device that establishes a connection with the controller within a predefined period, supports devices on the link whose control lines were de-asserted within the predefined period, and in response to each control line of each device that establishes a connection with the controller, assigning addresses to each device and receiving a controller request to drive each control line associated with each device to a first state for the number of bit clock cycles equal to the numeric identification of the particular control line.

9. A machine readable medium having stored therein a plurality of machine readable instructions executable by a processor to identify devices in communication with a controller via a link, comprising:

instructions to configure the link in an operational state;

instructions to receive a controller request to assert each control line associated with each device;

instructions to receive a controller request to de-assert each control line of each device that establishes a connection with the controller within a predefined period;

instructions to support devices whose control lines were de-asserted within the predefined period; and instructions, in response to each control line of each device that establishes a connection with the controller, to assign addresses to each device and receive a controller request to drive each control line associated with each device to a first state for the number of bit clock cycles equal to the numeric identification of the particular control line.

10. The machine readable medium claimed in claim 9, wherein instructions to receive a controller request to assert each control line associated with each device further comprises:

instructions to receive a controller request to drive each control line associated with each device to a first state.

11. The machine readable medium claimed in claim 9 wherein instructions to receive a controller request to de-assert the control line of each device that establishes a connection with the controller within a predefined period further comprises:

instructions to receive a controller request to drive each control line of each device that establishes a connection with the controller to a second state within a predefined period.

12. The machine readable medium claimed in claim 9, wherein instructions to receive a controller request to drive each control line of each device that establishes a connection with the controller to a second state within a predefined period further comprises:

instructions to receive a controller request to drive each control line of each device in sequential order.

13. The machine readable medium claimed in claim 9 wherein instructions to assign addresses to each device in response to each control line of each device that establishes a connection with the controller further comprising:

instructions to de-assert the frame synchronization signal; and instructions to initiate addressing in response to de-assertion of the frame synchronization signal.

14. The machine readable medium claimed in claim 13, wherein instructions to initiate addressing in response to de-assertion of the frame synchronization signal further comprises:

instructions to initiate addressing in response to the falling edge of the frame synchronization signal upon de-assertion.

15. The machine readable medium claimed in claim 9 further comprising:

in response to connection to the controller, instructions to receive a device request to relinquish control of the control line to the device.

* * * * *